UNITED STATES PATENT OFFICE.

W. SCOTT BARNEY, OF BALTIMORE, MARYLAND.

IMPROVEMENT IN COMPOSITIONS FOR PRESERVING MILK.

Specification forming part of Letters Patent No. 173,105, dated February 8, 1876; application filed August 30, 1875.

*To all whom it may concern:*

Be it known that I, W. S. BARNEY, of Baltimore, State of Maryland, have invented certain new and useful Improvements in Preserving Milk; and do hereby declare that the following is a full, clear, and exact description thereof.

The nature of my invention consists in a new, cheap, and simple process for preserving milk sweet and fresh for a limited period by the addition to the same of a few simple chemicals that shall prevent the milk from becoming sour, but shall not injure the milk as an article of food, nor be in the slightest degree detrimental to the health of the consumer. All dealers and consumers of milk understand and appreciate the difficulties attending their efforts to preserve milk sweet even for a few hours during the summer season, and when brought from a distance is often found, upon its arrival, unfit for delivery to consumers, thereby entailing great loss upon the producer and serious inconvenience to the public.

My invention will, to a great extent, overcome all the above-named objections and difficulties, and has no objectionable features, as the chemicals in the quantities used are not detrimental to health; but sour milk is when fed to infants, and is decidedly unpalatable to adults.

In order to enable others skilled in the art to make and use my invention I will now proceed to describe the manner in which the same may be carried into effect.

I dissolve in a sufficient quantity of water the following-named ingredients, and add the same, when thoroughly dissolved, to thirteen gallons of milk, or in the same proportion for a greater or less quantity: Salt, (chloride of sodium,) three ounces; sugar, (saccharum,) four ounces; saleratus, (bicarbonate of potash,) one ounce; saltpeter, (nitrate of potassa,) one-fourth ounce.

I do not confine myself to the exact proportions in the above formula, as the proportions may be varied somewhat.

Having thus fully described my invention, what I claim as new, and desire to secure by Letters Patent, is—

The within-described composition for the prevention of souring of milk, the composition consisting of salt, sugar, saleratus, and niter, substantially in the proportions specified.

In testimony that I claim the foregoing I have hereunto set my hand and seal this 30th day of August, 1875.

W. SCOTT BARNEY.

Witnesses:
GEO. H. MELLEN,
E. L. SCHMIDT.